United States Patent
Conte et al.

(10) Patent No.: US 7,413,814 B2
(45) Date of Patent: Aug. 19, 2008

(54) MULTILAYER GETTER STRUCTURES AND METHODS FOR MAKING SAME

(75) Inventors: Andrea Conte, Milan (IT); Marco Moraja, Milan (IT)

(73) Assignee: SAES Getters S.p.A. (IT)

( * ) Notice: Subject to any disclaimer, the term of this patent is extended or adjusted under 35 U.S.C. 154(b) by 222 days.

(21) Appl. No.: 10/866,345

(22) Filed: Jun. 10, 2004

(65) Prior Publication Data

US 2004/0253476 A1    Dec. 16, 2004

(30) Foreign Application Priority Data

Jun. 11, 2003    (IT)    ............... MI2003A1178

(51) Int. Cl.
*H01K 1/56*    (2006.01)
*H01J 17/24*    (2006.01)
*H01J 61/26*    (2006.01)

(52) U.S. Cl. ............. 428/613; 428/660; 428/662; 428/670; 428/632; 428/686; 428/687; 252/181.1; 252/181.6; 313/553; 313/558; 422/211

(58) Field of Classification Search .............. None
See application file for complete search history.

(56) References Cited

U.S. PATENT DOCUMENTS

| | | | | |
|---|---|---|---|---|
| 3,620,645 A | * | 11/1971 | della Porta et al. | ........ 428/553 |
| 4,312,669 A | | 1/1982 | Boffito et al. | |
| 4,925,741 A | * | 5/1990 | Wong | ........ 428/661 |
| 4,996,002 A | | 2/1991 | Sandrock et al. | |
| 5,453,659 A | | 9/1995 | Wallace et al. | |
| 5,688,708 A | * | 11/1997 | Kato et al. | ........ 445/25 |
| 5,701,008 A | | 12/1997 | Ray et al. | |
| 5,879,583 A | * | 3/1999 | Conte et al. | ........ 252/181.1 |
| 5,908,579 A | * | 6/1999 | Conte et al. | ........ 252/181.6 |
| 5,961,750 A | | 10/1999 | Boffito et al. | |
| 6,110,808 A | | 8/2000 | Saito | |
| 6,468,043 B1 | | 10/2002 | Benvenuti | |
| 6,499,354 B1 | | 12/2002 | Najafi et al. | |
| 6,554,970 B1 | | 4/2003 | Benvenuti | |
| 6,559,596 B1 | * | 5/2003 | Arai et al. | ........ 313/553 |
| 6,589,599 B1 | * | 7/2003 | Conte et al. | ........ 427/250 |

(Continued)

FOREIGN PATENT DOCUMENTS

GB        1484586        9/1977

(Continued)

OTHER PUBLICATIONS

Abstract for JP 2002-117839.*

(Continued)

Primary Examiner—John J Zimmerman
(74) Attorney, Agent, or Firm—TIPS Group

(57) ABSTRACT

Getter multilayer structures are disclosed, embodiments of which include at least a layer of a non-evaporable getter alloy having a low activation temperature over a layer of a different non-evaporable getter material having high specific surface area, both preferably obtained by cathodic deposition. The multilayer NEG structures exhibit better gas sorbing characteristics and lower activation temperature lower than those of deposits made up of a single material. A process for manufacturing such structures includes depositing a first, high surface area NEG film on a support, and then depositing a thin over layer of low activation NEG film.

21 Claims, 4 Drawing Sheets

U.S. PATENT DOCUMENTS

| | | | |
|---|---|---|---|
| 6,620,297 B2 * | 9/2003 | Conte et al. | 204/192.11 |
| 6,783,696 B2 * | 8/2004 | Conte et al. | 252/181.11 |
| 7,122,100 B2 * | 10/2006 | Conte et al. | 204/192.11 |
| 2002/0093003 A1 * | 7/2002 | Conte et al. | 252/181.1 |
| 2004/0169469 A1 | 9/2004 | Hasegawa | |

FOREIGN PATENT DOCUMENTS

| | | |
|---|---|---|
| JP | 10-314050 | * 12/1998 |
| KR | 10-2004-0013091 | 2/2004 |
| WO | WO98/37958 | 9/1998 |
| WO | WO00/75950 | 12/2000 |
| WO | WO02/27058 | 4/2002 |

OTHER PUBLICATIONS

Abstract for RU 2193254.*

Abstract for WO 9749109.*

Benvenuti, C., et al., "Vacuum properties of TiZrV non-evaporable getter films," Vacuum Elsever UK, vol. 60, No. 1-2, pp. 57-65 (Jan. 2001).

Benvenuti, C., et al., "Vacuum properties of palladium thin film coatings," Vacuum Elsevier UK, vol. 73, No. 2, pp. 139-144 (Mar. 2004).

* cited by examiner

MULTILAYER GETTER STRUCTURES AND METHODS FOR MAKING SAME

CROSS REFERENCE TO RELATED APPLICATIONS

This application claims the benefit of Italian Patent Application No. MI2003A001178, filed Jun. 11, 2003, which is incorporated herein by reference.

BACKGROUND OF THE INVENTION

1. Field of the Invention

The present invention relates generally to getter materials, and more particularly to multilayer deposits including an over layer of low activation temperature getter alloy.

2. Description of the Related Art

Non-evaporable getter materials, also known in the art as NEG materials, include transition metals such as Zr, Ti, Nb, Ta, V, and alloys or compounds thereof with one or more elements selected from Cr, Mn, Fe, Co, Ni, Al, Y, La and other rare earth elements. Such alloys include binary alloys such as Ti—V, Zr—Al, Zr—V, Zr—Fe and Zr—Ni, ternary alloys such as Zr—V—Fe and Zr—Co-rare earth elements, and other multi-component alloys. They can also include metal compounds (e.g. metal oxides), non-metal, organics, etc. NEG materials are scavengers, removing selected species, typically gaseous, depending upon their composition and operating conditions.

NEG materials are, for example, capable of reversibly sorbing hydrogen and irreversibly sorbing gases such as oxygen, water, carbon oxides and, in some cases, nitrogen. These materials are used for maintaining vacuum, as in, for example, evacuated interspaces for thermal insulation. Getter materials are also used to remove the above-mentioned species from inert gases, primarily noble gases and nitrogen, for example in gas-filled lamps or in the manufacture of ultrapure gases such as used in the microelectronics industry.

NEG materials can be employed in various forms, such as, for example, sintered pills or powders of the material within suitable containers. In some applications, for reasons of available space or for simplicity of construction, NEG materials are provided in the form of thin layers, generally tens or hundreds of microns (μm) in thickness, on an inner surface of an apparatus. Examples of uses of thin layers of NEG material are disclosed in U.S. Pat. No. 5,453,659, which describes Field Emission Displays (known in the art as FEDs), wherein discrete and thin deposits of NEG material are formed among electron-emitting cathodes on the anodic plate of a display. U.S. Pat. No. 6,468,043 describes coating of the inner surface of pipes defining the chamber of a particle accelerator with a NEG layer. U.S. Pat. Nos. 5,701,008 and 6,499,354 describe, respectively, the use of getter materials in micromechanical devices and in miniaturized IR radiation detectors. Micromechanical or microoptoelectronic devices are known in the art as "micromachines" or MEMs (microelectromechanics). In all of these applications, the NEG deposit (after activation) is employed at room temperature.

The functioning of NEG materials is based on reaction between the NEG metal atoms and the above-mentioned gaseous species. As a result of such reaction, oxide, nitride and/or carbide species are formed on the NEG surface at room temperature, resulting eventually in the formation of a passivating layer that prevents further gas sorbing. This passivating layer can form rapidly in the presence of large amounts of gas, for example at the first exposure to the atmosphere of the freshly produced NEG material, or during certain "dirty" manufacturing steps of the devices in which the material is contained. The layer forms, although more slowly, over time as a result of the normal functioning of the NEG in sorbing gaseous species.

At the beginning of its operating life, a NEG typically undergoes a thermal activation treatment, normally under vacuum, whose object is the migration of passivating layer species towards the inside of the material structure, thereby exposing a fresh and active metallic surface for gas sorption. The activation may be complete, providing, for example, a material surface essentially entirely made up of metal, or partial, providing, for example, a "mixed" surface, made up of areas of oxide-type species (or the like) and metallic areas. An activation degree can be defined, corresponding to the fraction of "free" surface sites, i.e. metals in the elemental state and consequently available for reaction with gases. In some cases, the activation treatment can be periodically repeated during a device's operating life, in a process called reactivation, to restore the initial NEG gas sorbing properties.

In theory, complete activation of an NEG would generally be desirable, but it can be unfeasible in the manufacture of certain devices, due to restrictions on manufacturing times and/or heat sensitivity of the particular device. Accordingly, partial activation is used for such devices, even though this results in lower gas sorbing properties and shorter NEG operating life.

The level of activation is dependent on process temperature and time; for example, an activation degree of 70% of a given material can be reached by treatment for 30 minutes at 350° C. or for 10 hours at 250° C., with the effect of temperature being greater than that of time. The conditions of activation also vary according to the physicochemical characteristics of the given material. For some materials, complete activation can require very high temperatures. For example, complete activation of an 84:16 Zr:Al alloy requires temperatures of at least 700° C. and preferably about 900° C., unless extremely long times, typically unacceptable in industrial production, are used. Other alloys, such as some ternary Zr—V—Fe alloys, require much lower activation temperatures and can be completely activated at about 350° C. in about one hour. As used herein, a "low activation temperature" material refers to a material (metal, intermetallic compound or alloy) which can be activated to a high degree (e.g. about at least 90%) by a treatment of one hour at a maximum required temperature of 300° C.

NEG deposits made up of a single metal (and particularly those of titanium, which are the most commonly used) can be easily manufactured by sputtering with open or porous morphology, which increases the effective surface area and consequently the initial gas sorption rate. For an effective activation (or reactivation), however, pure metals require comparatively high temperatures, generally higher than 450° C. In miniaturized devices such as FEDs or MEMs, wherein the NEG material is quite close to functional or structural parts of the device, the activation treatment can damage these parts. For example, in the case of FEDs, in which the NEG is generally placed at the peripheric region, heating at 400° C. can compromise the tightness of sealing between the two glass parts forming the display, which are made up of a low-melting glass paste. Similarly, exposure to these temperatures can compromise sealings between silicon components of MEMs, which are often composed of brazing alloys such as silver-based alloys or gold-tin or gold-indium alloys.

Certain NEG intermetallic compounds or alloys have low activation temperatures, for example about 300° C. or lower. However, the present inventors have determined that these materials, when deposited by sputtering, give rise to thin layers having extremely compact morphology and consequently a very reduced effective surface area, generally equivalent to only a few times the deposit geometrical area. This characteristic limits considerably the deposit sorbing properties at room temperature, particularly its initial sorption rate and its capacity. Such materials would require frequent reactivation, which may be impractical or impossible in certain applications.

Accordingly, currently known NEG deposits obtained by sputtering either have poor sorbing characteristics at room temperature (in particular, a low sorption rate) or require high activation temperatures incompatible with some applications, particularly in miniaturized devices. It would therefore be desirable to provide NEG materials which are characterized by low activation temperature and a large surface area.

SUMMARY OF THE INVENTION

An embodiment of the present invention provides a multilayer arrangement of non-evaporable getter materials, including a first or under layer of non-evaporable getter material having a relatively high surface area and, upon the first layer, a relatively thin second or over layer of a non-evaporable getter alloy with low activation temperature. The layers are preferably obtained by cathodic deposition, with minimal exposure of the first layer to reactive gases occurring between the deposition of the two layers.

In one aspect of the present invention, a getter structure includes a support, a first layer of a first non-evaporable getter having a high surface area disposed over a surface of the support, and a second layer of a second non-evaporable getter having a low activation temperature disposed over the first layer. Preferably, the first layer and the second layer are cathodically deposited films. Also preferably, the surface area of the first layer is equivalent to at least about 20 times its geometrical area, and the second layer is no thicker than about 1 µm.

A process for making a getter structure in accordance with an embodiment of the present invention includes depositing a first layer of a non-evaporable getter having a high surface area over a surface of a support, and depositing a second layer of a second non-evaporable getter having a low activation temperature over the first layer. Preferably, the first layer and the second layer are films deposited by cathodic deposition. Also preferably, the first layer is not exposed to gaseous species able to react therewith prior to the deposition of the second layer.

Advantageously, the multilayer structures of the invention provide a large effective surface area and have a low activation temperature, providing great operating and activation efficiencies. This and other advantages of the present invention will become more fully apparent when the following detailed description of the invention is read in conjunction with the accompanying drawing(s).

DETAILED DESCRIPTION OF THE PREFERRED EMBODIMENT(S)

I. Multilayer Deposits

Figure 1:
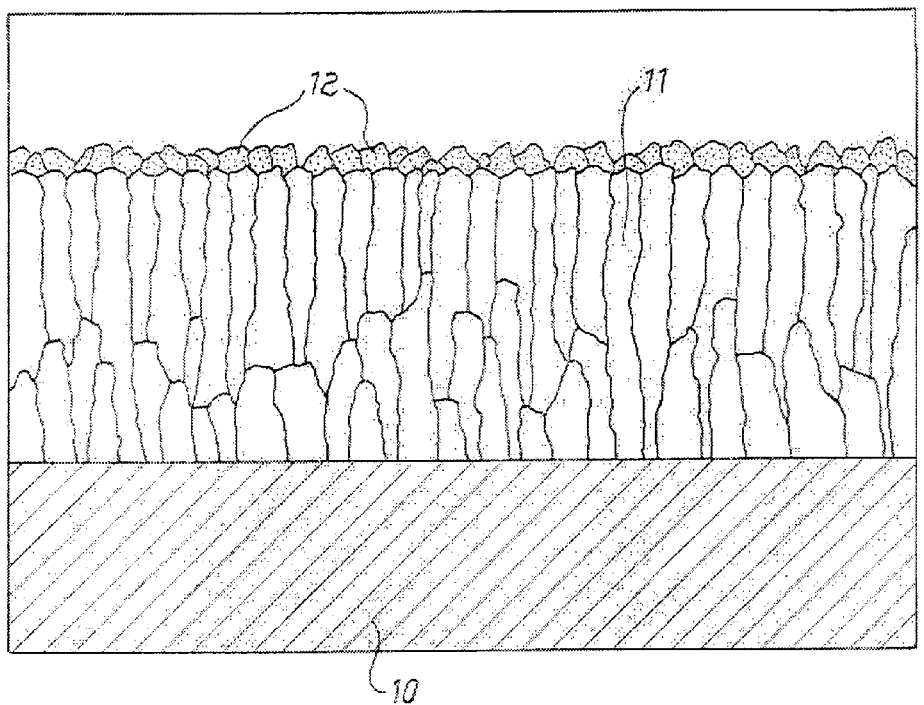
FIG. 1 shows a NEG multilayer structure in cross-section, in accordance with one embodiment of the invention.

In one aspect, an embodiment of the invention provides a multilayer deposit comprising at least a first layer (or "under layer") and second layer (or "over layer"), as described further below. FIG. 1 is a line drawing reproduction of a microphotograph of a multilayer in accordance with one embodiment of the invention, seen in cross-section, as obtained by scanning electron microscope.

The first layer, 11, of the multilayer deposit of the invention is preferably formed on a support, 10. This support can be one that is later applied to the inner surface of the end use device. Preferably, however, the support 10 is the inner surface of the end use device itself, in the case of medium or small sized devices which can be put into a sputtering chamber, such as FEDs or MEMs.

The first layer 11 preferably includes a NEG material that can be deposited by sputtering in the form of a layer having a large surface area. Preferably, a metal selected from niobium, tantalum, vanadium, hafnium, and, more preferably, zirconium and titanium, is used. Also preferred are alloys such as described in U.S. Pat. No. 5,961,750, incorporated herein by reference, comprising zirconium, cobalt and one or more elements selected from yttrium, lanthanum and other rare earth elements. Such alloys include alloys having the composition 80:15:5 Zr:Co:A, where A represents one or more of Y, La and other rare earth elements.

The thickness of layer 11 can vary widely. Preferably, the thickness is at least about 0.2 µm, to ensure sufficient coverage of the support and sufficient surface area. Preferred minimum thickness is also determined by the gas quantity that is expected to be sorbed. The maximum thickness is typically determined primarily by production parameters, such as the time necessary for layer growth, which generally dictates thicknesses lower than about 50 µm, for example between about 1 and 10 µm, if these thicknesses are compatible with the required sorption capacity. However, greater thicknesses can be used.

The layer 11 has a relatively large surface area, determined by its porosity. The porosity of such layers obtained by cathodic deposition can be expressed as a ratio between the effective surface area and the geometrical area. This ratio, indicated in the following as $R_e$, is 1 in the theoretical case of a perfectly smooth deposit, and increases with the increasing roughness or irregularity of the surface. For the purposes of the invention, $R_e$ is preferably greater than about 20 and more preferably greater than about 50.

Over layer 11 there is formed by sputtering at least a second layer, 12, preferably made from a low activation temperature getter alloy, preferably having a composition differing from that of layer 11. As used herein, a "low activation temperature" material refers to a material which can be activated to a high degree (e.g. at least about 90%) by a treatment of about one hour at a maximum required temperature of about 300° C. Of course, other definitions for "low activation temperature" will be apparent to those of skill in the art.

Preferred getter alloys for use in the second layer comprise Zr and V, and, optionally, one or more additional metals. For example, an exemplary getter alloy is $ZrV_2$. The additional metals may be selected, in some embodiments, from Fe, Ni, Mn, and Al, as described in U.S. Pat. No. 4,996,002; one such material is a getter alloy having the composition Zr 70%-V 24.6%-Fe 5.4% by weight, as described in U.S. Pat. No. 4,312,669. The additional metals may also be selected from yttrium and rare earth elements, such as lanthanum; one such material is a getter alloy having the composition 80%:15%:5% Zr:Co:A by weight, wherein A represents one or more elements selected from yttrium and rare earth elements, as described in U.S. Pat. No. 5,961,750. (In this case, the getter material of the first layer does not have this composition, and is preferably not a Zr:Co:A alloy.) The additional metal may also be titanium, as in a Zr—Ti—V alloy; one such alloy has the composition Zr 44%-Ti 23%-V 33%, which can be activated (at least partially) by heating for just a few hours at 200° C.

It is noted that the term "alloy" (or getter alloy or NEG alloy) as used herein can also include compositions corresponding to intermetallic compounds, such as, for example, the $ZrV_2$ composition, since sputtering thin material layers of such compositions typically results in an almost amorphous or irregular structure typical of an alloy. "Alloy" can also include compounds of various metals, such as metal oxides.

The thickness of layer 12 is preferably not greater than 1 µm, and even more preferably ranges from 50 to 500 nm. At these thicknesses, the layer retains the morphological characteristics of the underlying layer 11, and consequently retains high $R_e$ values and high sorption rate, while maintaining its low activation temperature properties.

Figure 2:
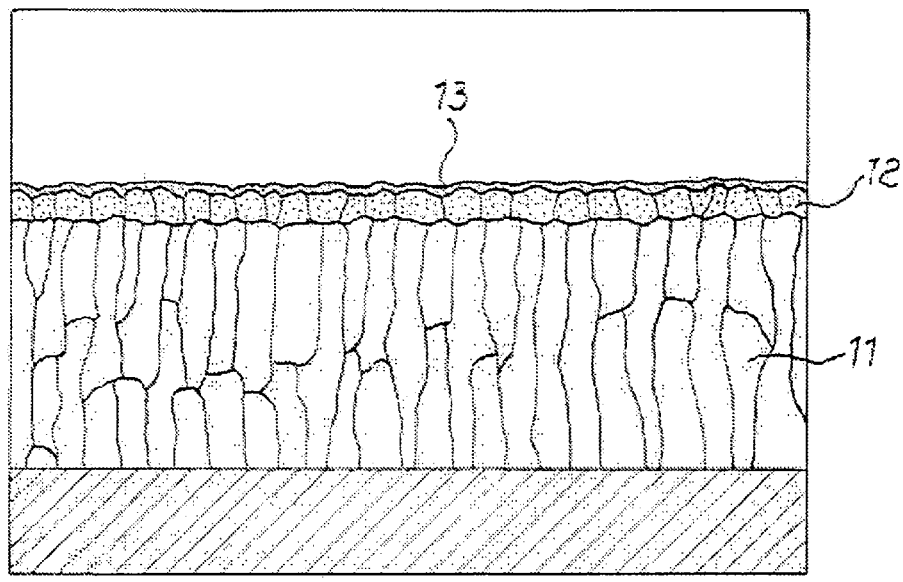
FIGS. 2 and 3 show, in cross-section, alternative embodiments of the multilayer of the invention.
Figure 3:
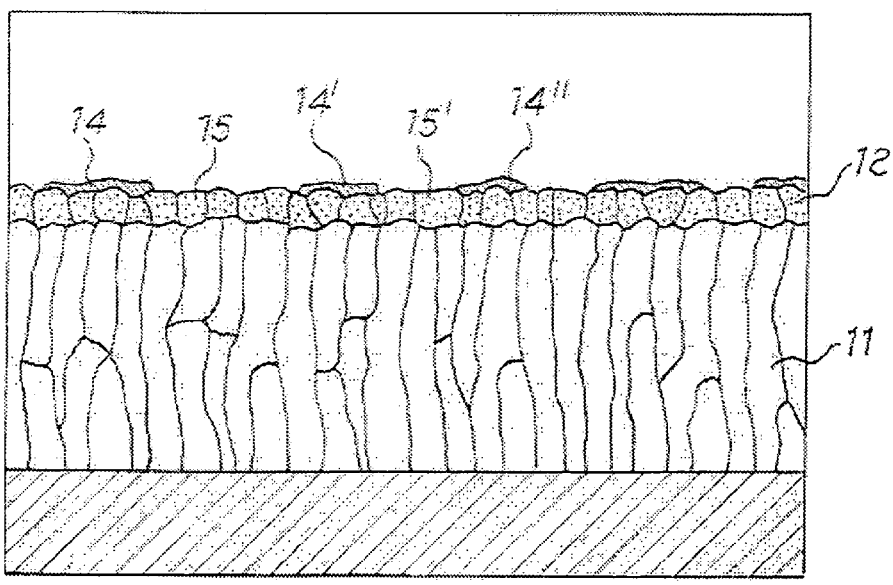

The multilayer deposits of the invention are oriented in use such that the layer formed by the low activation temperature NEG alloy (i.e. the layer 12 as described above) directly faces a space which is to be evacuated or wherein a gas to be purified is present. The second layer 12 may directly contact such space, over its entire surface (as shown in FIG. 1), or it may be covered in whole or in part by a further layer, as described below (FIGS. 2 and 3). Accordingly, the multilayer deposit optionally includes, on the upper surface of layer 12, a further layer, continuous or discontinuous, of palladium or of one compound thereof, such as palladium oxide, silver-palladium alloys comprising up to atomic 30% of silver, and compounds or alloys of palladium and one or more metals forming the getter material of layer 12.

For example, FIG. 2 shows an embodiment of the multilayer deposit having an additional continuous layer of palladium (13). The palladium layer 13 allows hydrogen selective sorption, as palladium, having high hydrogen permeability, allows the transfer of this gas towards the underlying getter material layer (see e.g. U.S. Pat. No. 6,554,970, incorporated herein by reference). To maximize the hydrogen transfer rate to the getter, the palladium layer is preferably no more than about 10 to 100 nm in thickness, although greater or lesser thicknesses may be desirable in certain embodiments.

FIG. 3 shows another embodiment employing a discontinuous deposit of palladium (or a compound thereof). In this case, palladium (or a palladium compound) is present in the form of "islands" 14, 14', 14", etc. on the getter layer 12 surface; these islands cover preferably from 10 to 90% of the layer 12 surface. Such a configuration is described in U.S. Pat. No. 6,682,817, incorporated herein by reference, with reference to getter materials in the form of powders. The islands, not sorbing gases other than hydrogen, are not passivated and consequently act as passages for continuous hydrogen transfer into the getter alloy, whereas the remaining zones 15,15', etc. of the layer 12 surface maintain their usual operation as getters. This structure thereby acts as a constant hydrogen sorber and as a sorber of other gases following suitable activation.

Getter systems made up of a first material on which a second one is deposited by sputtering are disclosed in U.S. Pat. No. 6,620,297, incorporated herein by reference. In the systems described therein, however, the underlying material is not obtained by sputtering, but rather is made up of a macroscopic body of sintered getter powders. The purpose of the deposit formed by sputtering on this macroscopic body is to reduce the loss of particles from the sintered material. The ratio between the volumes and the masses of the two components is such that the sputtered deposit has a negligible effect on the sorbing or activation characteristics of the system. In addition, the underlying material is exposed to the atmosphere before the application of the deposit layer by sputtering. As described below, the active layers of the deposits of embodiments of the present invention are preferably formed by sputtering, and the first layer is not exposed to any gases which would be reactive therewith (e.g. oxygen, nitrogen, water vapor, or carbon oxides) prior to application of the second layer.

II. Method of Preparing the Multilayer Deposits

In a further aspect, the invention provides a process for manufacturing multilayer NEG structures. The process includes two subsequent steps of deposition by sputtering of two different materials. More particularly, the process of an embodiment of the present the invention comprises first depositing by cathodic deposition on a support a first layer of a non-evaporable getter material, having a surface area equivalent to at least 20 times its geometrical area; and then depositing by cathodic deposition over said first layer a second layer, having a thickness not greater than 1 µm, of a non-evaporable getter alloy having a low activation temperature. Preferably, between the two mentioned deposition steps, the first layer is not exposed to gas species able to react therewith.

In particular, exposure of the first layer to oxidant species, such as oxygen or water, and thus passivation of the first layer, is preferably avoided. This is readily achievable by carrying out the deposition of the first and second layer in succession in a chamber which is either evacuated or filled with an inert gas such as argon. This process prevents passivation of the first layer.

Although the invention if not limited to mechanism of operation or effect, it is believed that the observed "transfer" of the low activation temperature of the second layer alloy to the underlying first layer material, which effect is demonstrated in the examples below, is promoted by the non-passivated state of the first layer.

The support 10 on which the first layer 11 is deposited is typically a planar support of metal, glass or silicon. The support may be placed, following layer deposition, into the final system at a suitable position. Preferably, however, when the size and shape of the device intended for the getter deposit allow, the deposition occurs directly on an inner surface of the device itself This preferred manufacturing procedure can be employed, for example, in the production of MEMs and FEDs.

A getter material layer 11, made up of a getter material as described above, is produced on the support by sputtering procedures known in the art. A typical sputtering procedure employs, in accordance with known methods, a vacuum chamber within which an electrical field can be generated. The chamber contains a target (generally in the form of a short cylinder) of the material to be deposited and a support on which the thin layer is to be formed. The chamber is evacuated and then backfilled with a noble gas atmosphere, generally argon, at a pressure generally from about 0.1 to 1.0 Pa. By applying a potential difference of a few thousand volts between the stands of the support and of the target, so that the latter is at cathodic potential, a plasma of $Ar^+$ ions is created; these ions are accelerated by the electrical field towards the target and cause its erosion through impact. The species (generally atoms or atoms clusters) derived from this target erosion are deposited on the support, thus forming the thin layer. The deposit can entirely cover the support surface, obtaining a single continuous deposit, or suitable maskings can be used to apply deposits to desired regions of the support.

In a variation of this method, known as magnetron sputtering, a magnetic field is applied to the plasma region, confining the plasma and improving the characteristics of cathode erosion and deposit formation.

In preparing the deposits of the invention, a first layer having high roughness or irregularity (and consequently the desired values of $R_e$) is preferably prepared, by employing process parameters such as the following. The support on which the deposition takes place is preferably cooled; in this way the atoms reaching the support have insufficient energy to rearrange and form more regular structures, thus achieving a kind of "quenching" of the deposit under formation. It is also preferable to operate at reduced currents, thus reducing the frequency of impacts between $Ar^+$ ions and the target and avoiding widespread heating of the system. Finally, by positioning the target not directly in front of the support, and/or by moving, rotating or vibrating the support during the deposition, the geometric disorder of the deposit can be increased.

Layer 12 can be formed by sputtering from a target having the desired composition, according to conventional procedures.

The optional deposit of palladium (or an alloy or compound thereof) can also be formed by sputtering, which is preferable from the aspect of convenience, or by other known techniques such as chemical vapor deposition.

III. Properties of Multilayer Deposits

As discussed above, getter layers having low activation temperatures are desirable. However, it has been found that monolayers of such getter alloys formed by sputtering tend to form compact layers having undesirably low effective surface areas.

It has been further found, in accordance with the present invention, that a multilayer deposit having a high surface area first layer (underlayer) and a low activation temperature second layer (overlayer) presents the combined advantage of low activation temperature with high effective surface area, as manifested in a high rate and capacity of gas sorption at room temperature.

Exemplary multilayer deposits of the invention were prepared (Examples 1 and 4) and compared with single layer deposits of either metal only (Example 3) or getter alloy only (Example 2) in room temperature sorption tests (Example 5). The sorption of the multilayer deposits at elevated temperature (300° C.) was also evaluated, as described in Example 6. In each case, the sample was first activated by radiofrequency heating at 300° C. for 30 minutes In the room temperature sorption tests, the species formed on the getter surface as a result of gas sorbing do not have sufficient energy enough to diffuse inwardly. The exhaustion of sorption capacity therefore shows that all the metallic sites initially available on the surface are saturated; accordingly, these tests are a measure of the starting number of these surface sites. In the high temperature tests, the species initially formed on the surface as a result of gas sorbing can diffuse inwardly; these tests therefore involve the entire amount of available getter material, and measure the entire capacity of the deposits.

Figure 4:
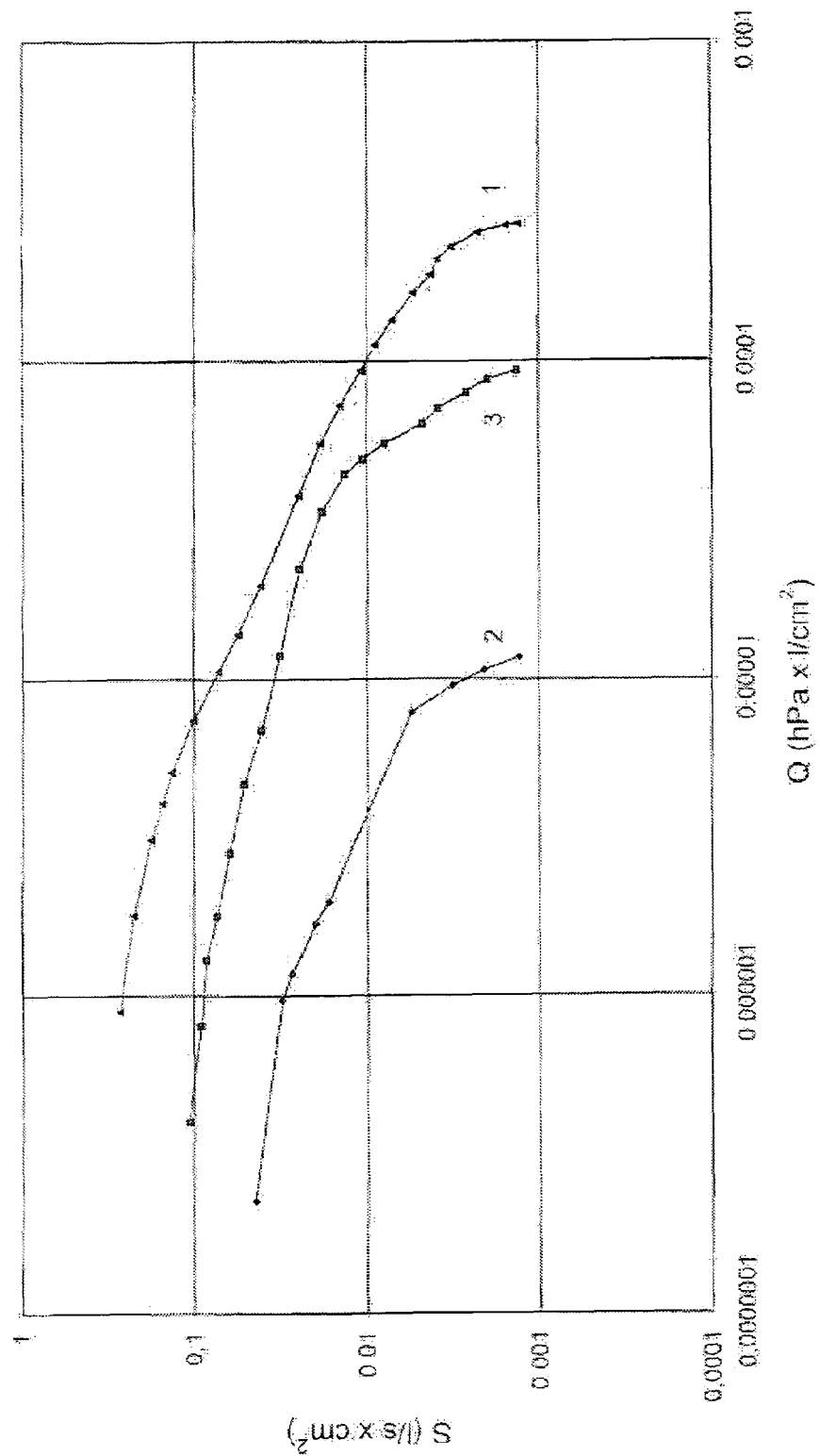
FIG. 4 is a graph showing gas sorbing properties of exemplary multilayer deposits of the invention and of a prior art NEG material.

As shown in FIG. 4, a multilayer deposit of the invention (designated sample 1), having a first layer of titanium and a second layer of $ZrV_2$ alloy, had room temperature surface sorption characteristics superior to those of deposits of metal only (sample 3) or alloy only (sample 2) over the entire range measured. In particular, the sorption rate and capacity of the invention multilayer deposit (curve 1) is greater by more than an order of magnitude than those of the deposit of NEG alloy only (curve 2), and at least double that of the deposit of titanium only (curve 3).

The difference in sorption rate and capacity of samples 1 and 3 (multilayer vs. titanium only) can be attributed to an lower degree of activation achieved for the titanium (sample 3) than for the getter alloy-containing composition at the same activation temperature (300° C. in these tests). A lower activation degree corresponds to a lower surface "cleanness", resulting in a reduced number of sites available for gas sorbing.

The difference in sorption rate and capacity of samples 1 and 2, where the exposed surface of the deposit is made up of the same material ($ZrV_2$ alloy), shows that the multilayer sample of the invention (sample 1) is characterized by a large specific surface, considerably greater than that obtainable depositing only the getter alloy (sample 2).

Figure 5:
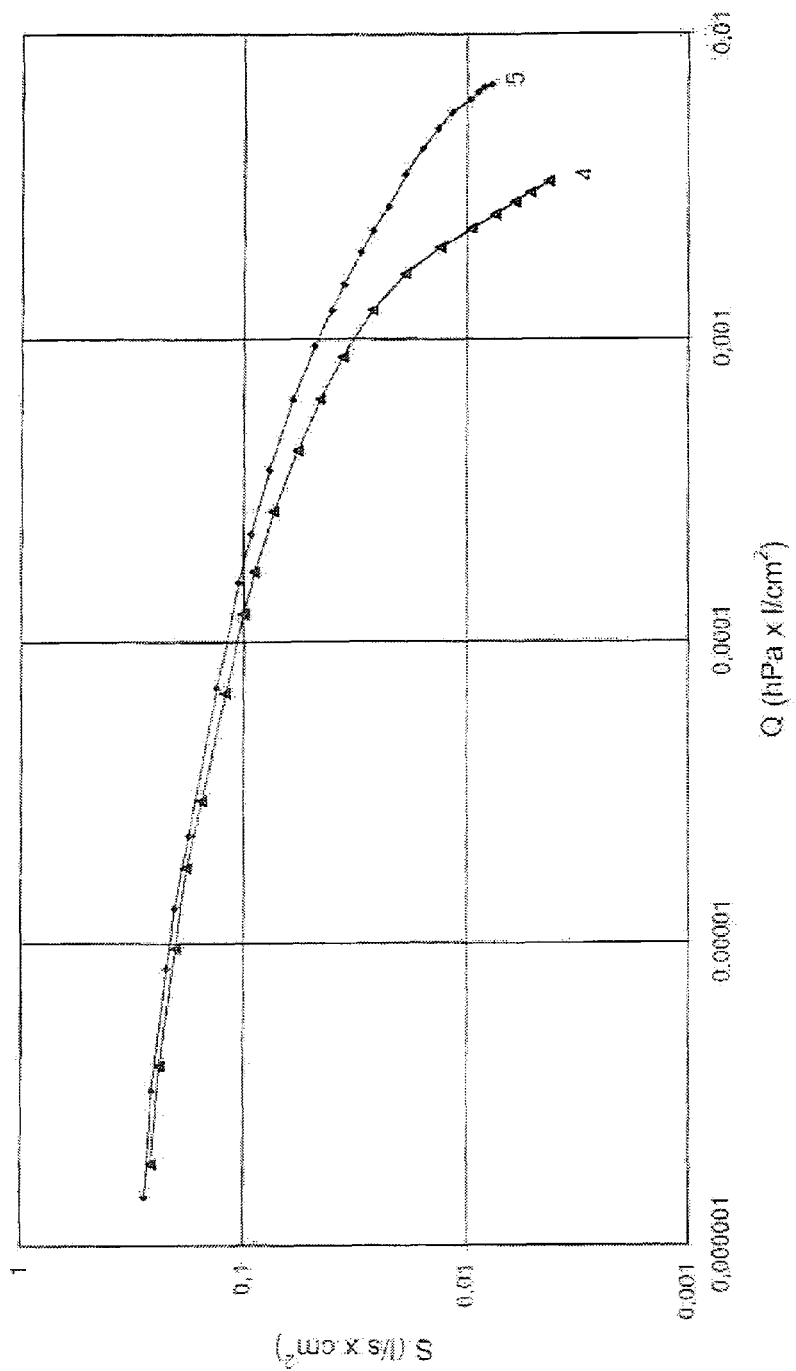
FIG. 5 is a graph showing gas sorbing properties of two exemplary deposits of the invention.

Sorption characteristics of the multilayer deposits at elevated temperatures are shown in FIG. 5. The two tested samples included a titanium underlayer and $ZrV_2$ overlayer, differing in that the sample of curve 5 (sample 1) included twice as much titanium as the sample of curve 4 (sample 4). As shown in the Figure, the two curves have the same initial sorption rate, confirming that at the beginning of the test the two samples are essentially equivalent in effective surface area and activation degree. Sample 1, however, shows a total capacity about twice that of sample 4, indicating that the titanium deposit underlying the alloy deposit takes part in gas sorption at the test temperature (300° C.).

From these analyses, it can be concluded that the multilayer deposits of the invention function as though they were a deposit of a single material having desirable characteristics of the component layers; i.e., the low activation temperature of the upper layer (layer 12) and the large effective surface area of the lower layer (layer 11). The latter property confers to the deposits high sorbing performances at room temperature which are not obtainable with deposits of getter alloys only.

EXAMPLES

The following examples are intended to illustrate but not to limit the invention.

Example 1

Preparation of a Multilayer Deposit Having Titanium Underlayer (3.3 μm) and $ZrV_2$ Over Layer This example provides an exemplary preparation of a double-layered deposit according to the invention.

A polished monocrystalline silicon disc having a diameter of 2.5 cm was cleaned in an ultrasonic bath with an organic solvent (an alcoholic solution of n-propylbromide) and subsequently rinsed in deionized water. This support was placed into a cathodic deposition chamber that can contain up to three targets of different materials. The chamber was evacuated to a pressure of $3\times10^{-6}$ Pa, then backfilled with argon to a pressure of 2 Pa. A titanium layer was first deposited, with the following operating parameters:
  power density on the target: 3.5 W/cm$^2$;
  target-support distance: 140 mm;
  support temperature: 100° C.;
  deposition time: 80 minutes.

Subsequently a second target of a $ZrV_2$ alloy was used, a layer of which was deposited on the titanium layer, employing a power density of 3 $W/cm^2$, a deposition time of 10 minutes, and the target-support distance and temperature given above.

The average thickness of the two layers was shown by electron microscopy to be 3.3 µm for the titanium layer and 0.2 µm for the $ZrV_2$ alloy. These thickness values (as all the thicknesses reported in the following examples) are average values.

This support having a two-layer deposit was designated sample 1.

Example 2 (Comparative)

Preparation of $ZrV_2$ Alloy Deposit

The operating parameters described for the alloy deposition in Example 1 are used to deposit a single layer $ZrV_2$ alloy, with the exceptions that the chamber was initially evacuated to $7 \times 10^{-6}$ Pa, and the deposition time was 60 minutes. The thickness of the deposit was shown by electron microscopy to be 3.5 µm.

This support having a one-layer deposit was designated sample 2.

Example 3 (Comparative)

Preparation of Titanium Deposit

The operating parameters described for the alloy deposition in Example 1 are used to deposit a single layer of titanium, with the exception that the deposition time was 90 minutes. The thickness of the deposit was shown by electron microscopy to be 3.5 µm.

This support having a one-layer deposit was designated sample 3.

Example 4

Preparation of a Multilayer Deposit Having Titanium Underlayer (1.6 µm) and $ZrV_2$ Overlayer The procedure of the Example 1 is repeated, with the exception that the titanium deposition lasts 40 minutes. The average thickness of the two layers was shown by electron microscopy to be 1.6 µm for the titanium layer and 0.2 µm for the $ZrV_2$ alloy.

This support having a two-layer deposit was designated sample 4.

Example 5

Room Temperature Gas Sorption of Monolayer and Multilayer Deposits

In this example, the gas sorbing properties at room temperature of samples 1, 2 and 3, prepared as described above, are evaluated.

The samples were mounted one at a time into a quartz bulb, which was evacuated before every test through a turbomolecular pump to a residual pressure of $1 \times 10^{-6}$ Pa, while heating at 180° C., which process took about 12 hours. The test sample was then activated by radiofrequency heating at 300° C. for 30 minutes, through an induction coil placed outside the bulb; the temperature was monitored with an optical pyrometer. The test sample was then allowed to cool to room temperature, and the gas sorption test was carried out according to procedures described in the standard ASTM F798-82, i.e. introducing into the bulb carbon monoxide, CO, at a pressure of $4 \times 10^{-4}$ Pa and recording the pressure decrease downstream at known conductance.

The results of the sorption tests of the three samples, discussed above, are shown in FIG. 4, wherein the number of each curve corresponds to the number of sample as above indicated. The curves show the sample sorbing rate, S, measured in liters of gas sorbed every second per square centimeter of deposit ($1/s \times cm^2$), as a function of sorbed gas quantity, Q, measured in liters of gas sorbed, multiplied by the sorption pressure (in hectoPascal, hPa), divided by the deposit surface ($hPa \times 1/cm^2$). The maximum value of Q of the three curves measures the total sample capacity.

Example 6

High Temperature Gas Sorption of Multilayer Deposits

In this example, the gas sorption properties at high temperatures of samples 1 and 4 are evaluated.

On a second sample prepared as described in Example 1, and on sample 4, CO sorption tests were carried out using procedures similar to those described in Example 5. The samples were activated by heating at 430° C., and the sorption tests were carried out at 300° C. The results are discussed above and shown in FIG. 5. Curve 4 presents the data for sample 4, and curve 5 presents the data for the duplicate prepared according to Example 1.

While this invention has been described in terms of several exemplary embodiments, it will be appreciated by those skilled in the art that various alterations, permutations, additions, equivalents are within the true spirit and scope of the invention. It is therefore not intended that the invention be limited to the examples and embodiments disclosed herein but, rather, be giving the full spirit and scope of the present invention, as exemplified by the appended claims.

The invention claimed is:

1. A multilayer non-evaporable getter structure comprising a first layer of a non-evaporable getter material having a surface area equivalent to at least 20 times its geometrical area, and directly contacting said first layer, a second layer, having a thickness not greater than 1 µm, of a non-evaporable getter alloy having a low activation temperature.

2. The structure of claim 1, wherein said second layer fully covers said first layer.

3. The structure of claim 1, wherein the getter material of said first layer is selected from the group consisting of zirconium, titanium, niobium, tantalum, vanadium, hafnium, and Zr—Co-A alloys, wherein A represents one or more elements selected from yttrium, lanthanum, and the other rare earth elements.

4. The structure of claim 1, wherein the thickness of said first layer is between about 0.2 and 50 µm.

5. The structure of claim 4, wherein said thickness of said first layer is between about 10 and 20 µm.

6. The structure of claim 1, wherein the surface area of said first layer is equivalent to at least about 50 times its geometrical area.

7. The structure of claim 1, wherein the getter alloy of said second layer comprises Zr and V.

8. The structure of claim 7, wherein said getter alloy further comprises smaller quantities of one or more elements selected from Fe, Ni, Mn, and Al.

9. The structure of claim 8, wherein said getter alloy has a composition by weight of about Zr 70%-V 24.6%-Fe 5.4%.

10. The structure of claim 1, wherein the getter alloy of said second layer has the composition of about 80%:15%:5% ZrCo:A by weight, wherein A represents one or more elements selected from yttrium, lanthanum, and the other rare earth elements, and the material of said first layer is different from that of said second layer.

11. The structure of claim 10, wherein said first layer is not a Zr:Co:A alloy.

12. The structure of claim 7, wherein the getter alloy of said second layer is a Zr—Ti—V alloy.

13. The structure of claim 12, wherein, the getter alloy of said second layer has the composition of about Zr 44%-Ti 23%-V 33%.

14. The structure of claim 7, wherein the getter alloy of said second layer is $ZrV_2$.

15. The structure of claim 1, wherein the thickness of said second layer is between about 50 and about 500 nm.

16. The structure of claim 1, further comprising a continuous or discontinuous layer of palladium or a compound thereof, deposited on the surface of said second layer opposed to the surface in contact with said first layer.

17. The structure of claim 16, wherein said palladium compound is selected from palladium oxide, sliver-palladium alloys comprising up to about 30 atom % of silver, and compounds of palladium with one or more metals forming the getter material of the second layer.

18. The structure of claim 16, wherein said layer of palladium or a compound thereof is discontinuous and covers from about 10 to about 90% of the second layer surface.

19. The structure of claim 16, wherein said layer of palladium or a compound thereof has a thickness between about 10 and about 100 nm.

20. A getter structure comprising:
a support;
a first layer of a first non-evaporable getter having a high surface area disposed over a surface of said support; and
a second layer a second non-evaporable getter having a low activation temperature disposed over said first layer.

21. A getter structure as recited in claim 20 wherein said first layer and said second layer are cathodically deposited films.

* * * * *